United States Patent
Wilhelm et al.

(10) Patent No.: US 7,084,234 B2
(45) Date of Patent: Aug. 1, 2006

(54) METHOD AND DEVICE FOR PRODUCING POLYESTERS, COPOLYESTERS AND POLYCARBONATES

(75) Inventors: Fritz Wilhelm, Karben (DE); Michael Reisen, Frankfurt am Main (DE)

(73) Assignee: Zimmer Aktiengesellschaft, Frankfurt/Main (DE)

( * ) Notice: Subject to any disclaimer, the term of this patent is extended or adjusted under 35 U.S.C. 154(b) by 0 days.

(21) Appl. No.: 10/513,227

(22) PCT Filed: Apr. 2, 2003

(86) PCT No.: PCT/EP03/03412

§ 371 (c)(1),
(2), (4) Date: Nov. 1, 2004

(87) PCT Pub. No.: WO03/093345

PCT Pub. Date: Nov. 13, 2003

(65) Prior Publication Data
US 2005/0222371 A1 Oct. 6, 2005

(30) Foreign Application Priority Data
May 2, 2002 (DE) .............................. 102 19 671

(51) Int. Cl.
*C08G 63/00* (2006.01)

(52) U.S. Cl. .................. 528/271; 422/131; 528/196; 528/198; 528/272

(58) Field of Classification Search ................ 422/131; 528/196, 198, 271, 272
See application file for complete search history.

(56) References Cited

U.S. PATENT DOCUMENTS

| 6,358,578 B1 * | 3/2002 | Otto et al. ................. 428/35.7 |
| 6,359,106 B1 * | 3/2002 | Nakamoto et al. ........ 528/308.6 |
| 2003/0139543 A1 * | 7/2003 | Wilhelm et al. .............. 526/65 |

FOREIGN PATENT DOCUMENTS

DE 10001477 * 7/2001

* cited by examiner

Primary Examiner—Terressa Boykin
(74) Attorney, Agent, or Firm—Jonathan Myers; Andrew Wilford

(57) ABSTRACT

In a process for producing polyester, the esterification of dicarboxylic acids and diols is carried out in at least one reaction stage, the prepolycondensation of the esterification product in at least one reaction stage and the polycondensation of the prepolycondensation product in at least one reaction stage. To increase the capacity of the apparatus forming one or more of the reaction stages in the production of the polyesters, at at least one of the reaction stages the supplied product system before it enters the reaction stage or within the reaction stage is divided into at least two partial streams and the partial streams entirely or partially separate from one another are passed through the reaction stage.

19 Claims, 3 Drawing Sheets

Figure 1:
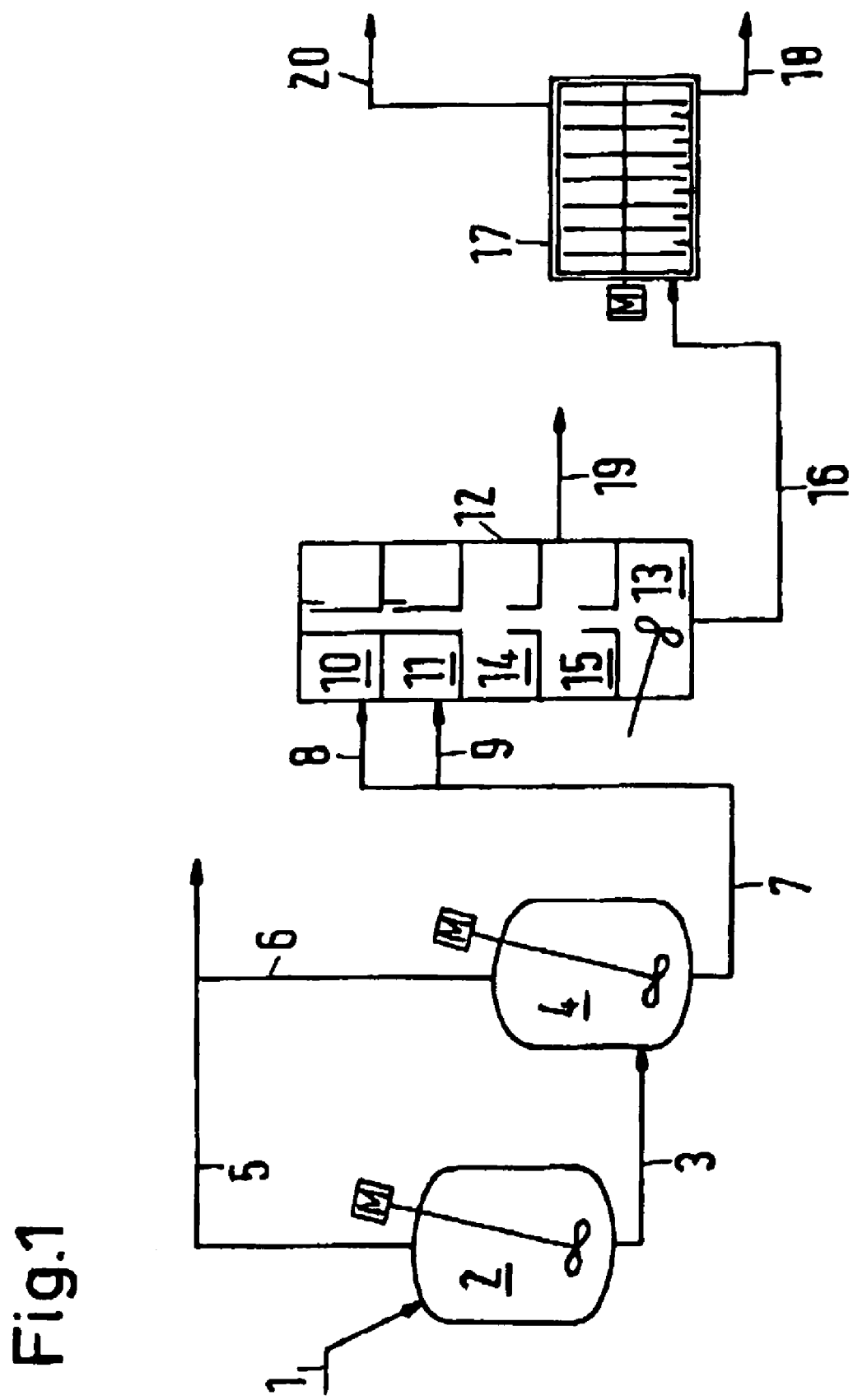

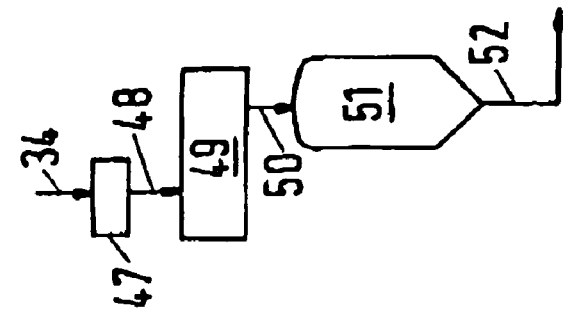
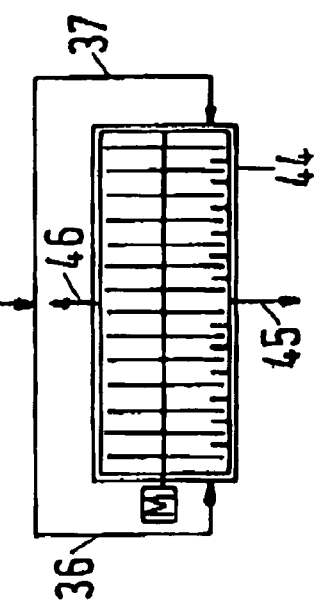
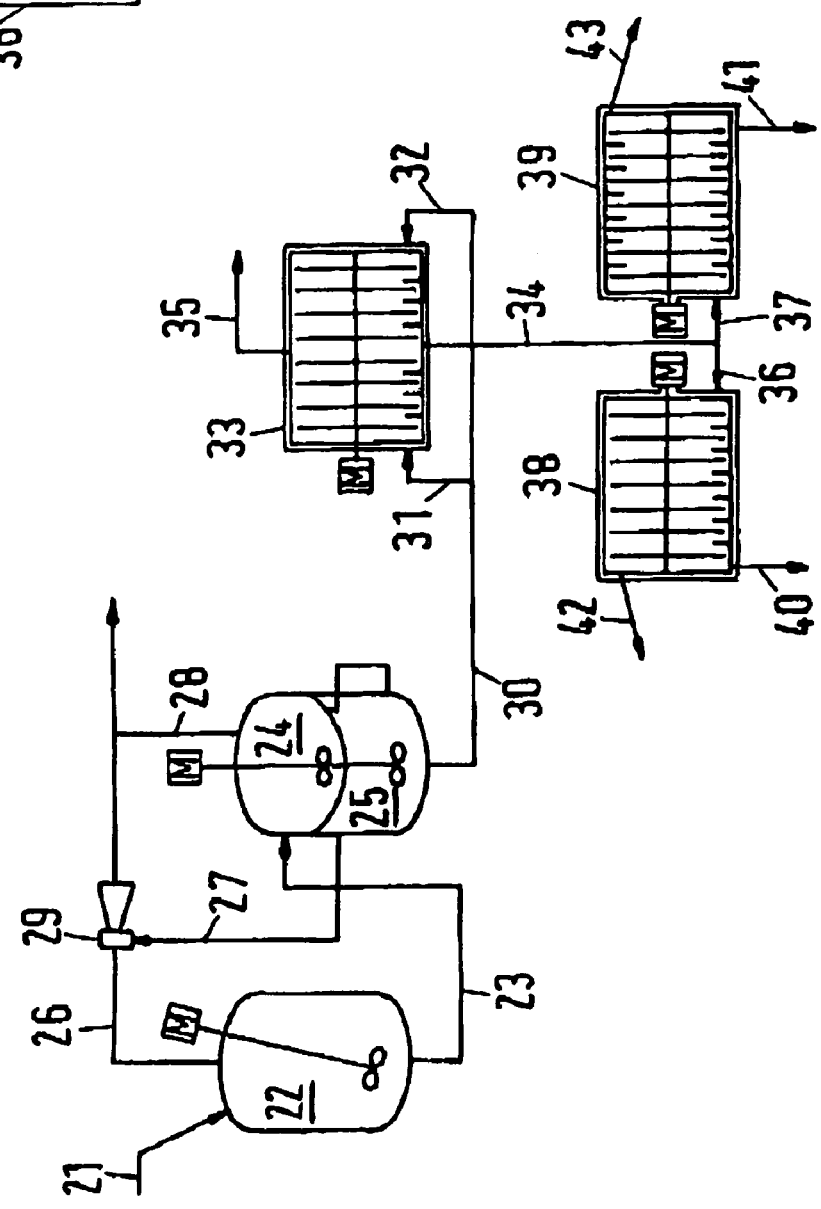

METHOD AND DEVICE FOR PRODUCING POLYESTERS, COPOLYESTERS AND POLYCARBONATES

The invention relates to a method and a device for producing polyesters, copolyesters and polycarbonates by the esterification of dicarboxylic acids or dicarboxylic acid esters and diols or by the transesterification of dialkylcarbonates or diaryl carbonates with bisphenols in at least one reaction stage, prepolycondensation of the esterification or transesterification products in at least one reaction stage and the polycondensation of the prepolycondensation product in at least one polycondensation stage.

For the continuous production of polyethyleneterephthalate (PET) and its copolyesters, terephthalic acid (PTA) or dimethylterephthalate (DMT) and ethyleneglycol (EG) as well optionally further comonomers are used as starting materials. PTA is mixed with EG and a catalyst solution to a paste and fed to a first reaction stage for esterification in which the esterification is carried out at atmospheric or superatmospheric pressure by the splitting off of water. When DMT is used, the DMT melt and the catalyst together with the EG are fed to a first reaction stage for transesterification in which reaction stage the reaction is carried out at atmospheric pressure by splitting off methanol (MeOH). The substances split-off are fed together with distilled EG to a rectification column for the recovery of EG.

The recovered EG is fed anew to the esterification or is used to produce the paste. The product stream of the esterification or transesterification is fed to a reaction stage for prepolycondensation which in general is carried out under vacuum. The product stream of the prepolycondensation is supplied to a reaction stage for polycondensation. The obtained polyester melt is processed directly to fibers or to chips. In the process for the production of PET the esterification is carried out in two reaction stages formed as stirred vessels. At plant capacities up to 400 metric tons per day, the prepolycondensation is performed in an upright cascade reactor with a stirred bottom zone and at plant capacities up to 900 tons per day in two polycondensation stages with the first designed as a stirred vessel and the next as a horizontal cascade reactor. These horizontal cascade reactors comprise chambers at the sump side and an agitator with vertical perforated disks or annular disks on a horizontal shaft serving for a defined surface generation.

The plans comprising two esterification stages, two prepolycondensation stages and a polycondensation stage with the first three reaction stages formed as stirred vessels and the last two reaction stages configured as horizontal cascade reactors allows a high stability and flexibility of PET production and offers the best possibilities for increasing the plant capacity, but involves a considerable increase in cost for equipment and building (Schumann, Heinz-Dieter: Polyester producing plants: principles and technology. Llandsberg/Lech: Verl. ModerneIndusrie, 1996, P. 27 to 33).

In a plant comprising two stirred vessels for esterification, a staged reactor for prepolycondensation and a horizontal cascade reactor for polycondensation, at relatively low cost one can obtain comparable stability and flexibility of polyester production but with the drawback that the dimensions of the reactors for polycondensation and the polycondensation stage must be larger because of the increased vapor volume and the permissible transport dimensions are achieved already at average plant capacities.

It is the object of the present invention, starting from the afore-described state of the art, to provide a method and an apparatus for carrying out the method, which allows a significant increase in the capacities of plants for producing PET with four reaction stages and alternatively a transfer of large plants with five reaction stages to four reaction stages without an increase in the vapor load and/or in the risk of product entrainment with the vapors from the prepolycondensation or polycondensation. Furthermore, in the production of polybutyleneterephthalate (PBT) from PTA and 1,4 butanediol (BDO) a critical vapor load shall be avoided in the esterification stage operated under vacuum.

These objects are attained in that the product stream supplied to at least one of the reaction stages before or inside the reaction stage is divided into at least two partial streams and the partial streams are passed through the reaction stage entirely or partly separately from one another.

According to a further feature of the invention, the partial streams, preferably in equal amounts are passed through the reaction stage converging up to a common product outlet or are passed through sections of the reaction stage parallel to one another towards a common product outlet, in the course of which the partial streams in the reaction stage are combined at the latest at the outlet and the flow rate of the product streams into and out of the reaction stage is controlled.

An alternative, in accordance with the invention consists in that the partial streams in the reaction stage for the prepolycondensation or polycondensation are passed in opposite directions to separate outlets.

In order to carry out the method it is within the scope of the invention to provide a cascade reactor or cage reactor which has at least two spatially separated sections divided in partial spaces to be passed separately and successively.

As a horizontal cascade reactor, preferably a stirring disk reactor with perforated or annular disks is used.

With partial streams which flow toward one another, the inlet of the partial streams is each provided at one end and the outlet for the product stream constituted by the partial streams is provided in the middle region of the stirring disk reactor.

In the case of a product line branching or a product differentiation by different viscosities, it is also expedient to provide the inlet of the product stream supplied for forming the partial streams in the central region and accordingly the outlets of the partial streams each at one end of the stirring disk reactor.

Instead of a stirring disk reactor the use of an upright multistage reactor is also possible at which the inlets of the product stream are disposed in the head region and the outlet for the product stream of the combined partial streams is disposed at the bottom and at least in the upper section partial stages connected in parallel are present for the separate passage of the partial streams and one subsequent stage or a bottom space for combining the partial streams.

A multistage reactor can be installed in such a way that inlet and outlet are connected through an external product recirculation line in which recirculation line an inlet for the product, means for heating of the product and elements for dividing the product stream into partial streams are integrated.

In the drawing several embodiments of the inventive method are represented in the form of flow diagrams which are described in greater detail below.

FIG. 1 shows a plant comprised of four reaction stages for the production of PET and in which over line (1) a paste-like mixture of PTA and EG together with a catalyst solution is continuously fed to a first reaction stage (2) configured as a stirred reactor in which a temperature of 260° C. and a pressure of 1600 mbar (abs) are maintained. The product stream flowing from the first reaction stage (2) is fed via a line (3) to a reaction stage (4) configured as a stirred reactor and maintained at a temperature of 263° C. and a pressure of 1080 mbar (abs). The vapors generated by the esterification reaction are drawn off via lines (5, 6) to a rectification column not shown here and are separated there, into water and EG. The EG obtained is directly fed back to the reaction stages (2, 4) and/or is used to form anew the paste-like mixture. The product stream having a degree of esterification of 97% is discharged via line (7) from the reaction stage (4) and is divided into two partial product streams of equal amounts which are fed via lines (8, 9) for the purpose of prepolycondensation into two identical input sections (10, 11) of a vertical multistage reactor (12) with a stirred bottom compartment (13) at a pressure of 15 mbar (abs), and flow through the succeeding sections (14, 15) before being recombined in the bottom compartment (13). Via line (16) the product stream flowing out of the multistage reactor (12) is fed for polycondensation to the front of a stirring disk reactor (17) with disk rings while the finished polymer is discharged at its rear end via conduit (18). Via conduit (19) of the multistage reactor (12) and via conduit (20) of the disk reactor (17) the respective vacuum required for operation is applied. To avoid entrainment of droplets from the multistage reactor (12), the stages (10, 11, 14, 15) can be divided into chambers and provided with droplet separators. With the afore-described plant concept, critical vapor loads are avoided even at high throughputs.

A further aspect of the method of the invention is shown in FIG. 2. Via line (21) the paste-like mixture comprised of PTA and EG together with the catalyst solution is fed for esterification into the first reaction stage (22) configured as a stirred vessel and the reaction product is fed via line (23) to a second reaction stage (24) consisting of a stirred vessel, in which partly a partial vacuum stage (25) with an operation pressure of 550 mbar (abs) is integrated. Via conduits (26, 27, 28), the vapors obtained during esterification are passed to a rectification column not shown here and separated into water and EG, whereby the vapors leaving the partial vacuum stage (25) at a temperature of 267° C. are compressed by means of a gas jet pump (29) operating with the vapors of the first reaction stage (22) as motive steam. The product stream discharged via conduit (30) from the partial vacuum stage (25) is divided into two partial product streams of equal amounts of which for the purpose of prepolycondensation one partial product stream is charged via line (31) to the front and the other partial product stream via line (32) to the rear of a stirring disk reactor (33) with perforated disks, whereby the partial streams flow axially from the outsides to the inside through two separate mirror-symmetrically identical reaction spaces. The product streams are combined in the middle plane of the stirring disk reactor (33) and the product showing a temperature of 274° C. is discharged via conduit (34). Via line (35) the required vacuum is generated and simultaneously the vapors formed during prepolycondensation are drawn off for the purpose of EG recovery. The product stream flowing out via conduit (34) is subdivided into two partial streams, which are charged via line (36) and line (37) each to a stirring disk reactor (38, 39) for polycondensation. The polycondensation product having at a temperature of 282° C. is discharged via lines (40, 41) from the stirring disk reactors (38, 39). The vacuum required in the stirring disk reactors is applied at the conduits (42, 43). Two reactors (38, 39) serve on the one hand to maximize the entire plant capacity and on the other hand for polymer diversification as well as for a decentralized product distribution in direct spinning.

According to FIG. 2A, it is also possible to feed the partial stream flowing off via line (36) at the front side and that flowing off via line (37) at the rear side of a single stirring disk reactor (44) with perforated disks and annular disks and to pass the partial streams axially from the outsides to the inside through two separate, mirror symmetrically identical reaction spaces. The product stream resulting from the combined partial streams is discharged in the middle plane of the stirring disk reactor via conduit (45). Via line (46) the required vacuum is produced and the vapors generated during polycondensation are drawn off.

A further modification of the process according to FIG. 2 is shown in FIG. 2B. Accordingly it is possible to produce from the product stream of precondensated PET discharged via conduit (34) initially amorphous or partly crystalline PET chips in a granulation system (47), to supply these chips via conduit (48) to a crystallizer system (49) with a temperature of 210° C. and subsequently to charge the chips via line (50) to a solid state polycondensation (SSP) in an inert gas stream at temperatures up to 230° C. in an upright tube reactor (51) known as SSP reactor. The finished chips are discharged from the SSP reactor via line (52).

Figure 3:
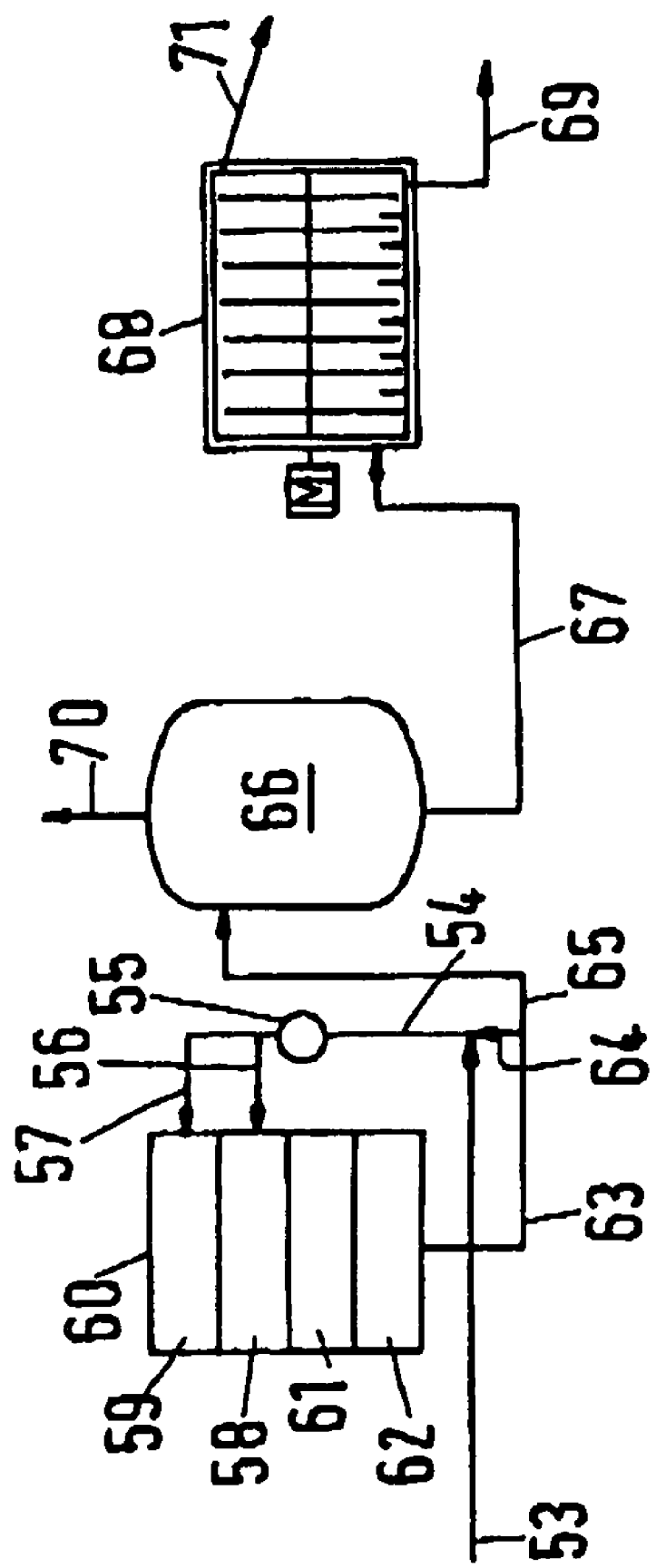

For the continuous production of polybutylenetere-phthalate (PBT), PTA and butandiol (BDO) are mixed together and the paste-like mixture according to FIG. 3 is fed via line (53) into line (54) including the heat exchanger (55) and divided into two partial product streams of equal amounts which are then fed via line (56) and (57) into parallelly disposed separate input sections (58) and (59) of a multistage reactor (60) for esterification at a temperature of 245° C. and a pressure of 400 mbar (abs). The separately guided partial product streams are combined in the intermediate section (61) and discharged from the bottom space (62) via line (63). A major portion of this product stream is recirculated via line (64) and further fed back through line (54) after the intake of the raw materials via line (53) to the head of the multistage reactor (60). Via line (65) the remaining portion of the product stream from the multistage reactor (60) is passed to the reaction stage (66) in which the prepolycondensation is carried out at a temperature of 240° C. and a pressure of 20 mbar (abs). For polycondensation, the prepolycondensate is fed via line (67) to the stirring disk reactor (68) from which the finished PBT is discharged by a conduit (69).

The mixture of water, tetrahydrofuran (THF) and BDO generated during esterification is treated in a rectification column. The head product THF and water is passed to a THF recovery and BDO as the sump product is supplied anew to the multistage reactor (60). The vapors from the prepolycondensation stage (66) and from the stirring disk reactor (68) are drawn off through lines (70, 71) to separate vacuum systems and are subjected to a partial condensation for the purpose of recycling the BDO.

The invention claimed is:

1. A method for the continuous production of polyesters, copolyesters or polycarbonates by the esterification of dicarboxylic acids or dicarboxylic acid esters and diols or by the transesterification of dialkylcarbonates or diarylcarbonates with bisphenols in at least one reaction stage, prepolycondensation of the esterification or reesterification product in at least one reaction stage and polycondensation of the precondensation product in at least one reaction stage, wherein at least one of the reaction stages, the supplied product stream before or within the reaction stage is subdivided into at least two partial streams and the partial streams are passed through the same reaction stage, entirely or partly, separately from one another.

2. The method according to claim 1, wherein the partial streams are passed through the reaction stage converging at a common product outlet.

3. The method according to claim 1, wherein the partial streams are supplied sectionwise parallel to one another in the reaction stage towards a common product outlet.

4. The method according to claim 1, wherein the partial streams are passed through the reaction stage in equal flow rates.

5. The method according to claim 1, wherein the partial streams are combined in the reaction stage at the latest at the outlet.

6. The method according to claim 1, wherein the partial streams in the reaction stage for the prepolycondensation or polycondensation are passed in opposite directions to separate outlets.

7. The method according to claim 1, wherein the flow rate of the product streams fed into or discharged from the reaction stage is controlled.

8. A device for carrying out the method for continuous production of polyesters, copolyesters or polycarbonates by esterification of dicarboxylic acids or dicarboxylic acid esters and diols or by transesterification of dialkylcarbonates for or diarylcarbonates with bisphenols in at least one reaction stage which is an esterification stage prepolycondensation of the esterification or transesterification product in at least one reaction stage which is a prepolycondensation stage and polycondensation of the prepolycondensation product in at least one reaction stage which is a polycondensation stage, whereby in at least one of the reaction stages the product stream supplied before or within the reaction stage is divided into at least two partial streams and the partial streams are passed through the same reaction stage entirely or partly separate from one another, wherein the reaction stage guiding the partial streams is a cascade reactor or a cage reactor which has at least two spatially separate sections divided into partial spaces through which the partial streams may flow separately one after the other.

9. The device according to claim 8, wherein the cascade reactor is a stirring disk reactor with perforated or annular disks.

10. The device according to claim 9, wherein in the case of converging partial streams the inlet for the partial streams is provided each at the ends and the outlet for the total product stream formed from the partial streams is provided in the middle region of the stirring disk reactor.

11. The device according to claim 9, wherein in the case of partial streams diverging in opposite directions the inlet for the product stream supplied for forming the partial streams is provided in the middle region and the outlet for the partial streams is provided at the end of the stirring disk reactor.

12. The device according to claim 8, wherein the cascade reactor is a multistage reactor having at least two inlets for the product stream at a head region and an outlet for the product stream of the combined partial streams at the bottom and at least in an upper section partial stages connected in parallel for feeding the partial streams and a consecutive section stage or a bottom space for combining the partial streams.

13. The device according to claim 12, wherein the inlets and outlet are connected through a recycle of the discharged product outside the multistage reactor by means of lines with elements included therein for dividing the product stream in the lines to separate inlets.

14. The device according to claim 8, wherein the outlet openings for vapor discharge of the cascade reactor or of the cage reactor are disposed as far as possible from the inlet openings.

15. The device according to claim 8, having esterification stages comprising two stirred reactors, a prepolycondensation stage comprising one multistage reactor and a polycondensation stage comprising one stirring disk reactor.

16. The device according to claim 8, having an esterification stage comprising two stirred reactors, a prepolycondensation stage comprising one stirring disk reactor and a polycondensation stage comprising one stirring disk reactor.

17. The device according to claim 8, having two esterification stages comprising two stirred reactors, a prepolycondensation stage comprising a stirring disk reactor, a granulator system, a crystallizer system and a vertical tube reactor forming a polycondensation stage.

18. The device according to claim 16, wherein in the second esterification stage a vacuum esterification stage is integrated.

19. The device according to claim 8, having a multistage reactor with an external product circulation as the esterification stage which is followed by a prepolycondensation stage and a stirring disk reactor for polycondensation.

* * * * *